United States Patent [19]

Fukuoka et al.

[11] Patent Number: 4,802,164
[45] Date of Patent: Jan. 31, 1989

[54] METHOD AND APPARATUS FOR TESTING A MULTI-PROCESSOR SYSTEM

[75] Inventors: Kohei Fukuoka, Tokyo; Satoshi Takemura, Hadano; Yatao Takesue; Hisashi Tamaru, both of Hadano, all of Japan

[73] Assignees: Hitachi Ltd.; Hitachi Computer Engineering Co., Ltd., both of Tokyo, Japan

[21] Appl. No.: 762

[22] Filed: Jan. 6, 1987

[30] Foreign Application Priority Data

Jan. 10, 1986 [JP] Japan ................................. 61-3330

[51] Int. Cl.⁴ .............................................. G06F 11/00
[52] U.S. Cl. .................................. 371/16; 340/825.5; 364/200
[58] Field of Search ............... 371/15, 16, 17, 18; 364/200, 900; 340/825.5, 825.51

[56] References Cited

U.S. PATENT DOCUMENTS

| | | | |
|---|---|---|---|
| 3,806,878 | 4/1974 | Edstrom | 371/16 X |
| 4,315,311 | 2/1982 | Causse et al. | 364/200 |
| 4,315,313 | 2/1982 | Armstrong et al. | 364/200 |
| 4,627,054 | 12/1986 | Cooper et al. | 371/16 X |
| 4,627,055 | 12/1986 | Mori et al. | 371/16 |
| 4,646,298 | 2/1987 | Laws et al. | 371/16 |

Primary Examiner—Charles E. Atkinson
Attorney, Agent, or Firm—Antonelli, Terry & Wands

[57] ABSTRACT

A testing method and apparatus for a multi-processor system including a plurality of processors and a plurality of peripheral devices such as input/output (I/O) devices are disclosed. The processors can paralley access specified I/O devices. The apparatus comprises a plurality of I/O control tables each coupled to each of the I/O devices, and storing status information of the (I/O) device, and a scheduler for controlling accessing between the plurality of processors and the plurality of I/O devices. A lock control flag indicating whether each of the I/O devices is locked by one of the processors or not, is set in the respective I/O control table. The scheduler arbitrarily selects a processor which is accessible to an unaccessed I/O device on the basis of the state of the lock control flag of the I/O control table, each time of starting of the I/O device. Then, each time of starting of the I/O device. Then, a test program is executed, for the selected I/O device accessed by the selected processor, repeatedly with respect to different combinations of the I/O devices and the processors.

6 Claims, 6 Drawing Sheets

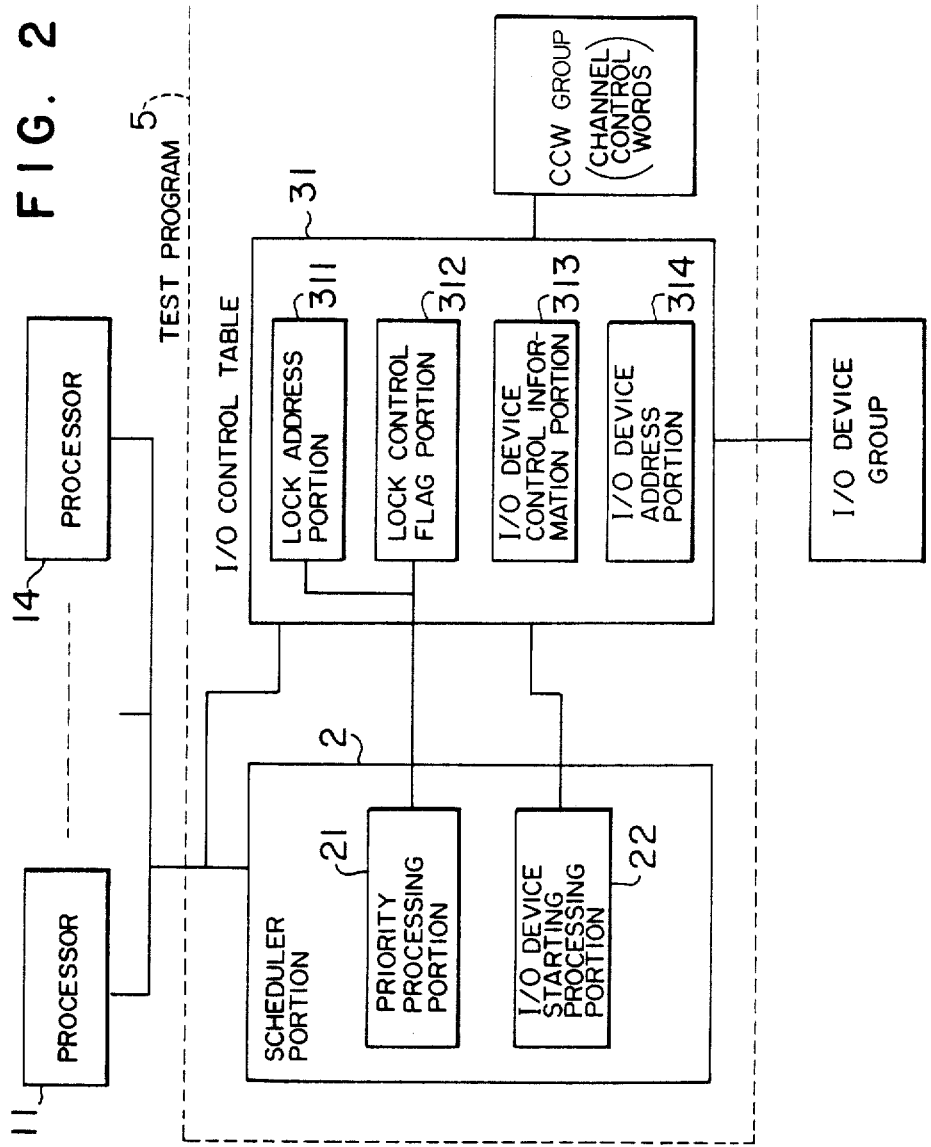

FIG. 3

I/O CONTROL TABLE 31

| | |
|---|---|
| I/O DEVICE MODEL NAME | ~315 |
| I/O DEVICE ADDRESS | ~314 |
| EXECUTED JOB ADDRESS | ~316 |
| INFORMATION LINKED WITH OTHER I/O CONTROL TABLE | ~317 |
| OPTION FUNCTION FLAG | ~318 |
| OPTION MESSAGE | ~319 |
| VOLUME NAME OF I/O DEVICE OF FILING LINE | ~320 |
| MAXIMUM RESPONSE TIME | ~321 |
| LOCK ADDRESS PORTION | ~311 |
| LOCK CONTROL FLAG PORTION | ~312 |
| NUMBER OF STARTING INSTRUCTION ISSUES | ~330 |
| NUMBER OF ERROR OCCURRENCES | ~331 |
| NUMBER OF OVERRUN OCCURRENCES | ~332 |
| ERROR RECOVERY PROCESSING CCW ADDRESS | |
| CCW ADDRESS | |
| EXPECTED VALUE OF CSW | |
| REAL VALUE OF CSW | |
| TEST LEVEL | |
| STARTING ADDRESS OF EXPECTED DATA AREA | |
| STARTING ADDRESS OF EXECUTED DATA AREA | |
| RANDOM DATA | |
| STARTING ADDRESS OF TRACE AREA | |
| TRACE AREA POINTER | |
| STATUS FLAG | |
| OTHERS | |

Rows from NUMBER OF STARTING INSTRUCTION ISSUES through OTHERS are bracketed as ~313.

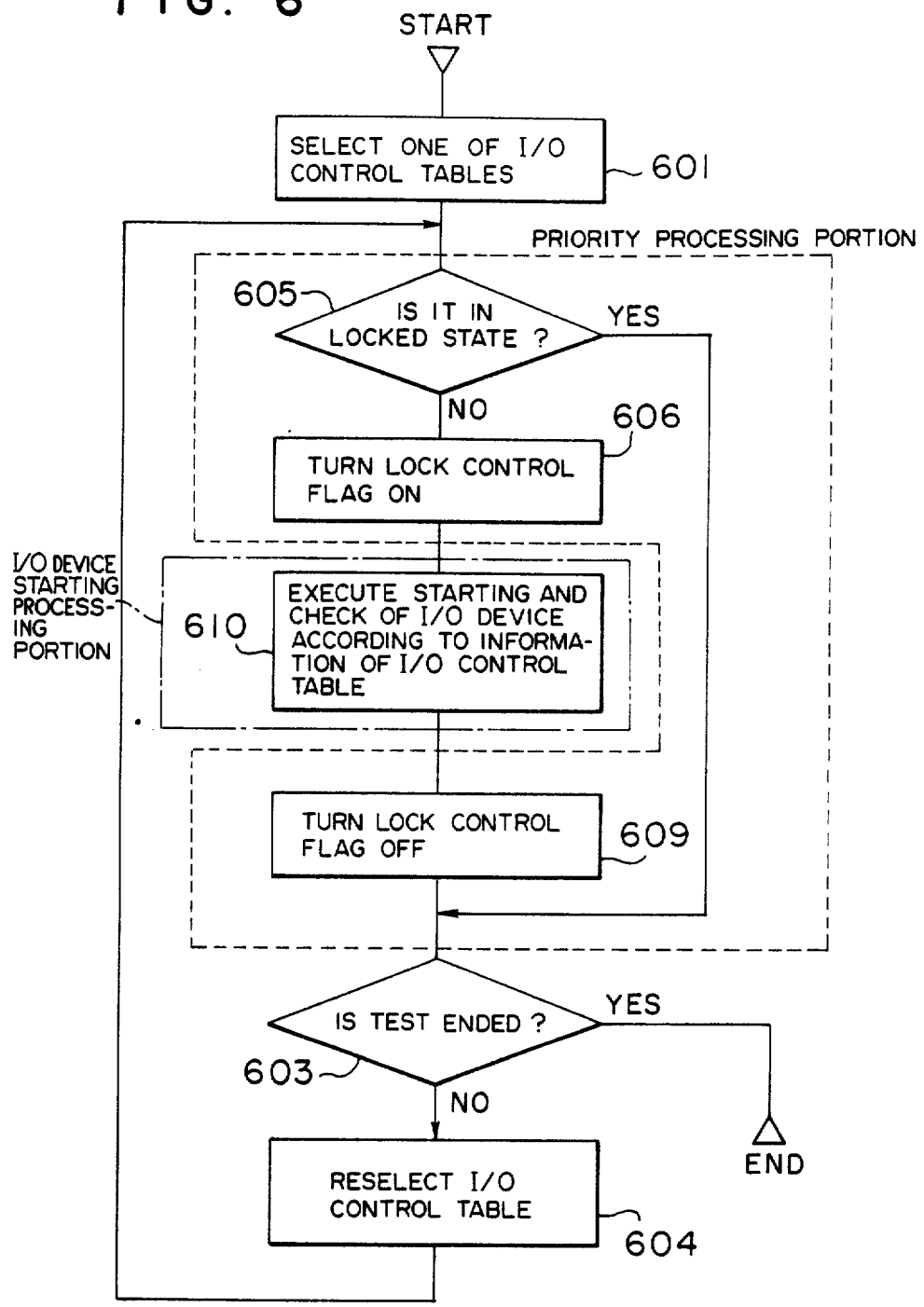

METHOD AND APPARATUS FOR TESTING A MULTI-PROCESSOR SYSTEM

BACKGROUND OF THE INVENTION

The present invention relates to a method and apparatus for testing a multi-processor system and in particular to a testing method and apparatus for a multi-processor system which is capable of controlling accessing of a plurality of processors to arbitrary input/output devices at random.

A testing program for the purpose of multiple working tests of input/output devices of an information processing system is needed to have a control function of starting a plurality of input/output devices with high efficiency and checking responses from the input/output devices. Such control function involves processings determined by program structures and logics. For this reason, in general, the testing program has a scheduler controlling the order of starting of the input/output devices and an input/output control table storing status information of each of the input/output devices. However, heretofore, according to the control function, each of the input/output devices is accessed by a specified processor corresponding to a certain job or task while inhibiting the other processors from accessing thereto. Accordingly, in the case where a multi-processor system becoming more and more important in general-purpose large scale systems is tested, the prior art method has drawbacks that reliability of the test is not satisfied and that the time required for the test increases. This is because the multi-operation of the input/output device must be increased and the start control of the input/output devices needs to be performed at random. A prior art example of this kind has been disclosed in JP-A-No. 60-72039, in which a task for monitoring each task under execution is provided to detect the condition of the execution task by a register for reference.

SUMMARY OF THE INVENTION

In order to remove the prior art problems as described above the object of the present invention is to provide a testing method and apparatus for a multi-processor system capable of changing or switching the processor accessing an input/output device for every input/output instruction (i.e. for every start of an input/output device), in the case where a job or task issues a plurality of input/output instructions to input/output devices.

In order to achieve this object, according to one feature of the present invention, an input/output control table provided for each of the input/output devices to store status control information for the input/output devices, has lock control flags indicating whether the input/output control table is locked by the processor accessing the relevant input/output device or not and lock addresses indicating the address of the locked processor and a scheduler controlling the order of starting the input/output devices has a priority processing function of selecting and determining a processor accessing an input/output device at random for every start of an input/output device based on the lock control flags and/or the lock addresses, the flags indicating the status of the respective input/output device, as set in the control table.

BRIEF DESCRIPTION OF THE DRAWINGS

FIG. 2 illustrates an example of the structure of the testing program indicated in FIG. 1;

FIG. 3 shows a format of an input/output control table in detail;

FIG. 6 is a flow chart representing the control, in the case where the lock address portion is omitted in the input/output control table.

DESCRIPTION OF THE PREFERRED EMBODIMENTS

Hereinbelow an embodiment of the present invention will be explained in detail, with reference to the drawings.

Figure 1:
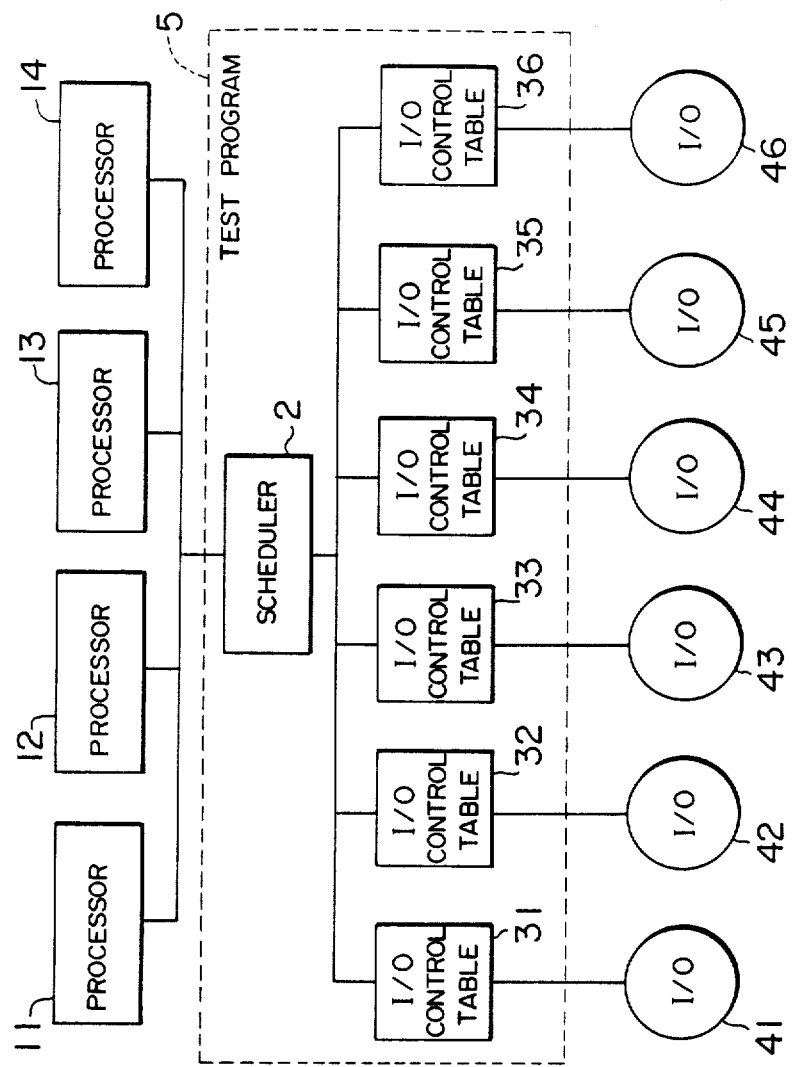
FIG. 1 is a block diagram illustrating an embodiment of the testing method for a multi-processor system according to the present invention.

FIG. 1 is a block diagram illustrating an embodiment of the testing method for a multi-processor system according to the present invention.

In FIG. 1, processors 11-14 and input/output (I/O) devices 41-46 are hardware constituting a multi-processor system. The processors 11-14 belong to a central processing unit and the input/output devices 41-46 are peripheral devices such as keyboards, line printers, disk driving devices, etc. A testing program 5 is located in a main memory device (MS) of the system and controls starting instructions for the input/output devices 41-46 from the processors 11-14. A scheduler 2 controls the order of the execution of the testing program 5. The entity of this testing program 5 (the program area on the MS) may be only one existing in the main memory device and the processors 11-14 read out and execute instruction words of the scheduler 2 without being influenced by other control operations by the fact that the testing program 5 has a reentrant program structure. Input/output control tables 31-36 are located e.g. in the data region of the testing program 5 and correspond to the input/output devices 41-46 in a one-to-one relation.

FIG. 2 illustrates the relation between the scheduler 2 and the input/output control tables 31-36 in the testing program 5. In FIG. 2, for the purpose of convenience, only table 31 is shown, representing the input/output control tables 31-36. A lock control flag portion 312 in the input/output control table 31 has an area of e.g. one byte, where a one-byte data X"FF" is set in the hexadecimal notation, when either one of the processors 11-14 refers to the relevant input/output control table or effects a write-in operation therein. A lock address portion 311 has an area of two bytes and when X"FF" is set in the hexadecimal notation in the lock control flag 312, i.e. when the relevant input/output control table is in the locked state, the address of any one of the processors 11-14, which has locked the input/output control table, is set. This is performed by the fact that e.g. the CPU address is stored in the main memory device by a STAP instruction (Store CPU Address) and this is copied in the lock address portion 311. Further, it is at the moment of a termination after starting of the input/output device or a trouble report on the input/output device side that the locked state is turned off. That is, the starting of the input/output device produces either one of the results that it succeeds and that it fails for some reasons. In both the cases, the lock control flag 312 is turned off. Both the lock address portion 311 and the lock control flag portion 312 are set or referred to by a priority processing portion 21 in the scheduler 2. The content of an input/output control information portion 313 is control information for the input/output device corresponding to the relevant input/output control table 31. The control information is delivered to a starting processing portion 22 in the scheduler 2 as the information controlling the input/output device as well as to an input/output address portion 314 specifying the input/output device. FIG. 3 shows the format of an input/output control table in detail.

In addition, the input/output control tables 32-36 have the same format as that indicated in FIG. 3.

Now the input/output control table 31 will be explained below in detail, referring to FIG. 3.

An input/output device model name 315 is composed of letter data of 12 bytes and the model names of the input/output devices are e.g. C'KBD Δ 8092 ΔΔΔΔ, C'MT ΔΔ 8488 ΔΔΔΔ.

The input/output device address 314 is e.g. hexadecimal data of 4 bytes and indicates an input/output address of each of the input/output devices.

The testing program 5 has a testing job for each of the input/output devices. The input/output table 31 is linked with a testing job suitable for each of the input/output device model names, depending on an executed job address 316.

Link information portion 317 relating to linkage with other input/output control tables stores information necessary for the case where a plurality of input/output devices such as disk devices are connected to the main frame by a plurality of paths.

An option function flag 318 is composed of e.g. hexadecimal data of 3 bytes and stores information concerning various kinds of additional mechanisms of various kinds of input/output devices in the form of a 24-bit flag. The meaning of each of the bits differs from each other, depending on the type of input/output device.

An option message 319 is composed of e.g. letter data of 48 bytes. It indicates the features of the input/output device and the message thereof is outputted as needed.

Volume name 320 of the input/output device of the file-device is composed of e.g. letter data of 6 bytes indicating the volume name.

Maximum response time 321 is composed of e.g. hexadecimal data of 2 bytes, which are time data, during which 1 bit has a value in a certain unit time. For example, X"0010" represents 16 sec. and X"OOFF" represents 255 sec. Set values are different, depending on the type of the input/output device. If a started input/output device does not respond in a period of time specified here, the testing program judges that the relevant input/output device has produced a time out error.

Further, the number of starting instruction issues 330, the number of error productions 331 and the number of overrun productions 332 are composed of e.g. hexadecimal data of 4 bytes, respectively.

The priority processing portion 21 of the scheduler 2 indicated in FIG. 2 is incorporated according to the present invention and provides the processor issuing an input/output instruction with priority determined according to the order of arrival. The detail of its working mode will be explained later, with reference to the flow chart indicated in FIG. 5. The input/output device starting processing portion 22 selects a processing suited to the status of the input/output device at that time among a series of processings concerning the actual input/output operation and executes it.

Here, the conditions of the input/output device can be classified roughly in the following four groups.

(a) Enable State:
The input/output device is started and the program is executed.

(b) In Working (wait for termination report):
It is checked whether time out is produced or not.

(c) Termination Reported (wait for check):
It is checked whether the report of the input/output device is correct or not.

(d) Unenable State:
Neglected. (go to processings for other I/O devices immediately without executing any processing to the I/O device concerned.)

At first, an input/output multiple working test by means of the scheduler 2, when the priority processing portion 21 is not incorporated, will be explained with reference to the flow chart indicated in FIG. 4.

The scheduler 2 selects an arbitrary one among the input/output processors 31-36 (Step 401). Then, in the input/output device starting processing portion 22, the starting or termination report of the input/output device 41-46 is checked (Step 402). The input/output device starting processing portion 22 selects one processing suited to the contents of the input/output device control information portion 313 at that time among a series of processings concerning the actual input/output operation and executes it. That is, when it is recognized on the basis of the status flag of the input/output control information portion 313 that the input/output device waits for starting, the input/output device starting processing portion 22 forms a CCW (Channel Control Word), issues a starting instruction, and at the same time, changes the status flag of the input/output device control information portion 313 to the termination report waiting state. Further, when it is recognized on the basis of the status flag that the input/output device is in the state where the termination report has been effected, the input/output device starting processing portion 22 checks input information (CSW (Channel Status Word), data, etc.) coming from the input/output device and changes the status flag of the input/output device control information portion 313 to the starting waiting state. If the input/output device is in the termination waiting state, the input/output device starting processing portion 22 does nothing and the operation is ended. That is, every time one input/output device is started once, the input/output device starting processing portion 22 is operated twice or more.

The input/output device starting processing portion 22 has three sorts of processings for an input/output device, which can be tested, but effect only one sort of processings by one execution. That is, when one input/output device is started once, by the first execution it effects the starting of the input/output device and by a second or later execution it checks the termination report, if the input/output device is in the state where the termination report has been carried out. By what execution the termination report is checked depends on the response time of the input/output device.

When the processing in the input/output device starting processing portion 22 is ended, the scheduler 2 judges whether the test should be ended or not (Step 403). When the test should be continued, either one of the input/output device control tables 31-36 is reselected (Step 404) and the input/output device starting processing portion 22 is again operated. That is, in the case where a certain job issues starting instructions $M_{(n)}$ times for n input/output devices the number of times of instruction execution, M(1), M(2), M(n) being assumed for I/O device 1, I/O device 2, I/O device n, respectively, the scheduler 2 operates the input/output device starting processing portion 22

$$\sum_{i=1}^{m} (M_{(i)} \times 2 + \alpha)$$

times, where α indicates the number of times, when the input/output device starting processing portion 22 terminates its operation, having done nothing, because the input/output device is in the course of an operation.

Figure 4:
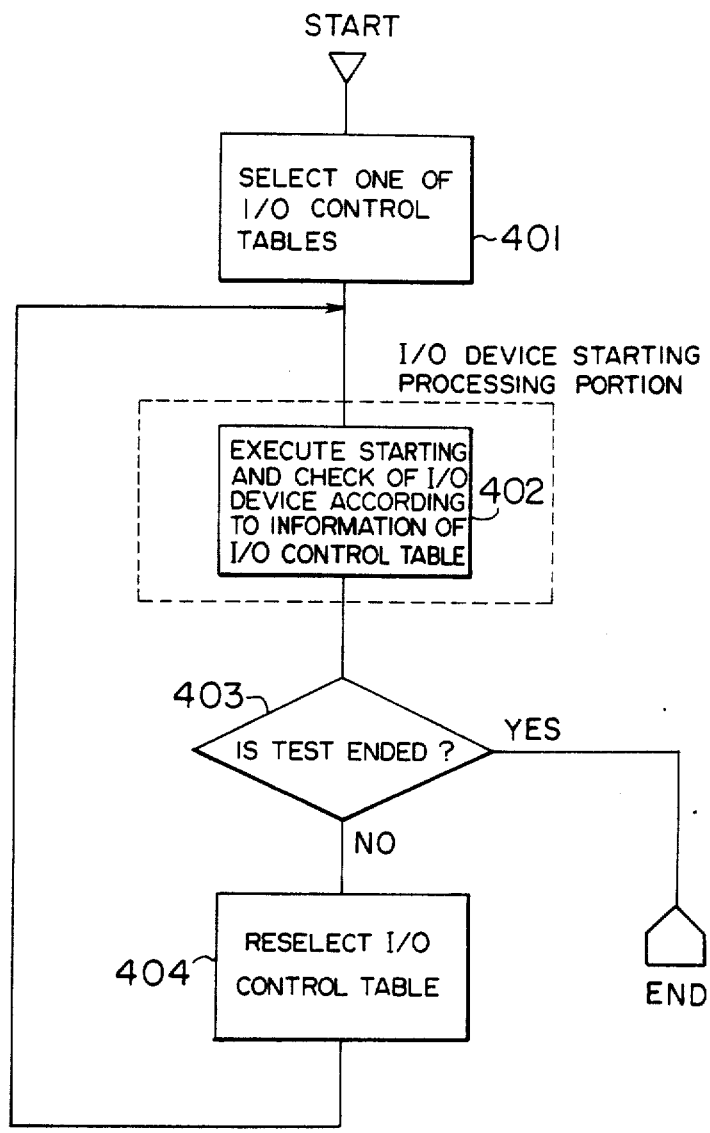
FIG. 4 is a flow chart representing the control indicated in FIG. 2, in the case where no priority processing portion is incorporated.

Although the processing indicated in FIG. 4 is suitable for an input/output multiple working (multi-operation) test in a single processor system, when the processing described above is applied to a multi-processor system as it is, there is a possibility that erroneous information is introduced in the input/output device control information portion 313, when a plurality of processors select the same input/output control table and operate the input/output device starting processing portion 22 at the same time. When one fixed processor is used at the execution level of jobs in order to resolve the above problem, as long as input/output starting processings are executed $$\sum_{i=1}^{m} (M_{(i)} \times 2 + \alpha)$$

times, as described above, it is impossible to test the connections of n input/output devices relating to the job with other processors and therefore to realize the multi-operation testing of input/output devices of a multi-processor system.

For the above reason, according to the present invention, apart from the input/output device starting processing portion 22, a priority processing portion 21 is incorporated in the scheduler 2. The priority processing portion 21 refers to the lock address portion 311 and the lock control flag portion 312 in the input/output control tables and operates to inhibit, only when a certain processor executes the input/output device starting processing portion 22, other processors from executing the input/output processing portion 22 for the same input/output device.

Now, the processing by means of the scheduler 2 will be explained, in the case where the priority processing portion 21 is incorporated, with reference to the flow chart indicated in FIG. 5.

One of the processors selects one of the input/output control tables, independently of the operations of the other processors (Step 501). Then, the on/off state (i.e. "1" or "0") of the lock control flag portion 312 is judged in order to know whether the selected input/output control table has been already selected by another processor or not (Step 505). If the lock control flag portion 312 is off, the processor itself turns the lock control flag portion 312 on (Step 506) and sets its own control address in the lock address portion 311 (Step 507). To the contrary, if the lock control address portion 312 has been already turned on, since it is necessary to judge whether it is another processor, which has locked the relevant input/output control table, or not, the processor compares the address portion 311 set in the relevant input/output control table with its own control address (Step 508). If they are found to be not identical as a result of the comparison, it is recognized that the relevant input/output control table has been already selected by another processor. Consequently, the starting processing for the input/output device thus judged is inhibited and the processor selects another input/output control table. If it is selected by none of the processors, the processor executes starting of the input/output device or checking of the termination report according to the information in the relevant input/output control table through the input/output device starting processing portion 22 (Step 502). When it is ended, the processor turns the lock control flag portion 312 in the relevant input/output control table off (Step 509). Steps 503 and 504 are identical to those described with reference to FIG. 4.

That is, the priority processing portion 21 executes a series of processings so that, among the processors, which have selected a certain input/output control table, only the processor having the priority according to the judgements 505 and 508 gains access to the input/output device and further that the priority is invalidated by Step 509, after the processing of the input/output device starting processing portion 22 has been terminated.

The object of the invention relating to multi-operation testing of input/output devices in a multi-processor system is to inhibit a plurality of processors from accessing an input/output device at the same time and on the other hand not to lower the processing speed of the whole system. According to the present invention, it is possible to achieve the object by providing the priority processing portion 21 in the scheduler 2. Further, the priority processing portion 21 executes the Steps 505 and 508 under serialization. Thereby, it is prevented that the priority processing/portion 21 itself is interferred with by priority processing of the other processors.

Figure 5:
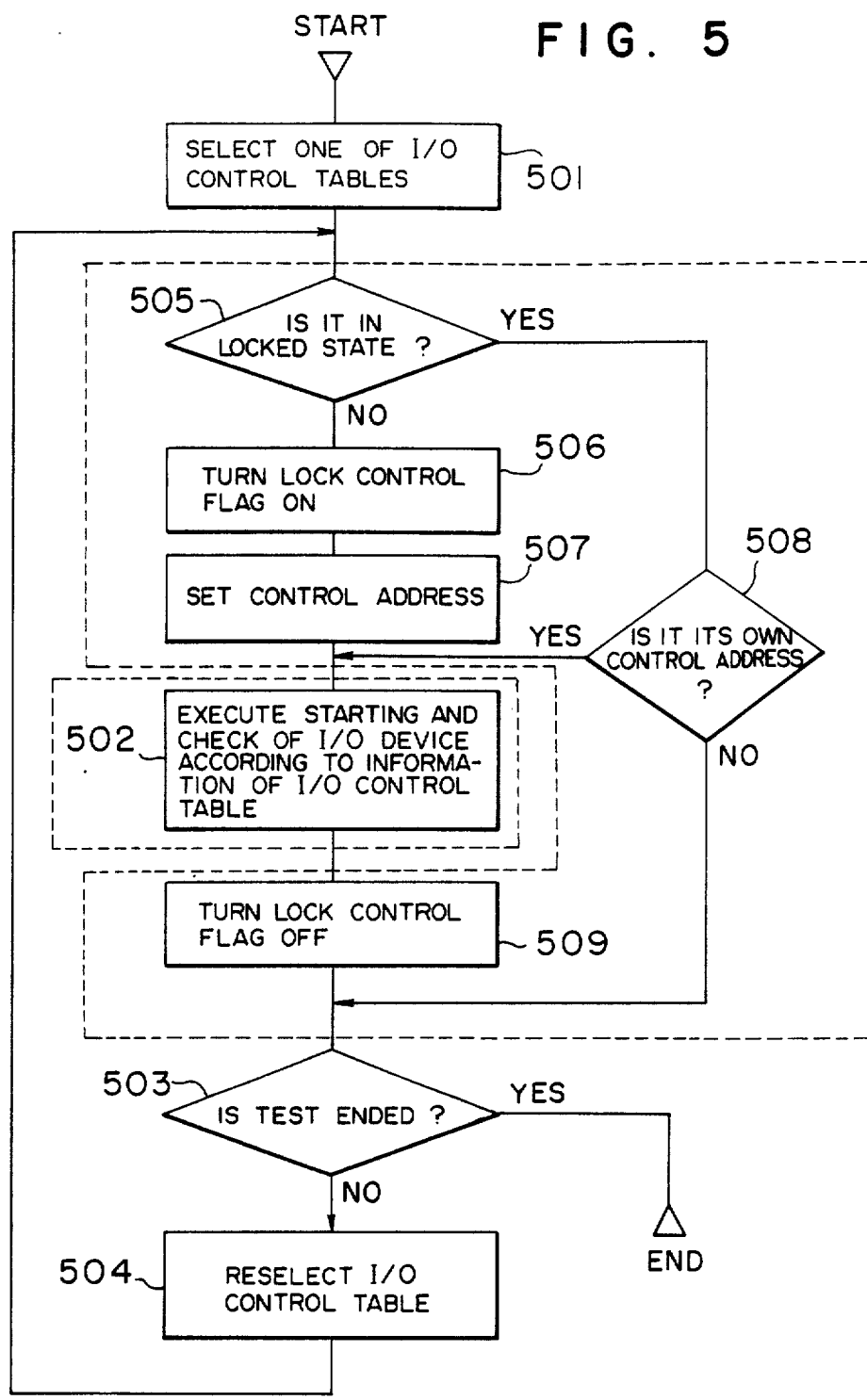
FIG. 5 is a flow chart representing the control indicated in FIG. 2, in the case where a priority processing portion is incorporated.

Furthermore, in Step 506 in FIG. 5, in the case where the processor, which has turned the lock control flag on ("1"), interrupts the execution by itself and starts the same input/output device for another purpose (e.g. message output, etc.), it is necessary that the processor can refer to/write in the input/output control table, even if the lock control table is turned on. In order to make it permissible, the two Steps 507 and 508 and the lock address portion 311 are disposed.

FIG. 6 is a flow chart illustrating another embodiment of the present invention. The embodiment differs from that indicated in FIG. 5 in that there is no lock address in the input/output control table. Consequently, the Steps 507 and 508 in FIG. 5 are unnecessary in the priority processing portion 21.

Now, the processing according to the flow chart indicated in FIG. 6 will be explained.

One of the processors selects one of the input/output control tables, independently of the operations of the other processors (Step 601). Then, the on/off state of the lock control flag portion 312 is judged in order to know whether the selected input/output control table has been already selected by another processor or not (Step 605). If the lock control flag portion 312 is in an off state, the processor itself sets the lock control flag portion 312 in an on state (Step 606). To the contrary, if the lock control address portion 312 has been already in an on state, the processing proceeds to Step 503. Then, the processor executes starting of the input/output device or checking of the termination report according to the information in the relevant input/output control table through the input/output device starting processing portion 22 (Step 610). When it is ended, the processor turns the lock control flag portion 312 in the relevant input/output control table off (Step 609). Steps 603 and 604 are identical to those described with reference to FIG. 4.

That is, in the embodiment, the priority processing portion 21 executes a series of processings so that, among the processors, which have selected a certain input/output table, only the processor having the priority according to the judgment 605 is allowed to access the input/output device and further that the priority is invalidated by Step 609, after the processing of the input/output device starting processing portion 22 has been terminated.

The embodiment is effective for the scheduler, which executes a control such that the processor interrupts Step 610 and effects no processing to give the same input/output device another starting instruction. Further, although the lock address portion 311 in the input/output control tables 31-36 is composed of two bytes, it may have any bit structure having a necessary number of bits in agreement with the number of processors constituting the system. In addition, in the case where the scheduler 2 has no reentrant program structure, the program can be constructed by dividing each program area of the processors 11-14. That is, the program located on the MS is copied in other areas equal in number of the number of the processors, so that each processor can execute the respective program thus copied exclusively. In the above, an embodiment of present invention has been explained. However, the processings indicated in FIGS. 5 and 6 may be realized in any way by hardware, microprograms, or firmware.

As it is clearly seen from the above explanation, according to the present invention, it is possible to construct a scheduler which makes it possible to determine one of a plurality of input/output devices connected to a multi-processor system at random each time an input/output starting instruction is executed, depending on the processor accessing them. Further, in the embodiments described above of the present invention a plurality of input/output devices can be put in their operation state at the same time so that they can execute different jobs at the same time. In this way, an input/output device multi-operation test such as (a) simultaneous (parallel) tests of a plurality of types of input/output devices, (b) heavy load tests of an input/output control device, (c) various kinds of function tests of the control device and the main memory device, (d) simultaneous (parallel) execution of the above-mentioned tests (a)–(c), etc. can be performed more easily and thus, a test having a high multiplicity and permitting a plurality of processors to control access to an arbitrary input/output device at random is enabled. Furthermore, an advantageous effect can be obtained that already existing software resources, e.g. other input/output multi-operation testing programs, become usable for a multi-processor system with slight modifications.

We claim:

1. A method of testing a multi-processor system including a plurality of processors and peripheral devices adapted to be accessed from said plurality of processors, comprising the steps of:

providing a scheduler for controlling the order of staring of said peripheral devices;

providing peripheral device control tables in one-to-one relation to respective peripheral devices for storing status information thereof, said control table being rewritable and having a lock control flag indicating whether the corresponding peripheral device is occupied by one of said plurality of processors;

switching by means of said scheduler at least one in said plurality of processors to access one of said peripheral devices based on the state of said lock control flag of the corresponding control table each time the peripheral device is started during execution of a task or job for a test program; and executing a desired test for the accessed peripheral device, said scheduler updating the state of the lock control flag for every starting of the peripheral device.

2. A test method according to claim 1, further including a step of releasing said lock control flag in response to termination of an operation of the peripheral device.

3. A test method according to claim 2, further including a step of inhibiting the same peripheral device from being accessed by a plurality of processors at the same time.

4. An apparatus for testing a multi-processor system including a plurality of processors, and peripheral devices adapted to be switchably coupled to said plurality of processors under control of a program, comprising:

memory means for storing a scheduler for controlling the order of staring of said peripheral devices and a plurality of rewritable peripheral device control tables each being provided for a respective device and each having a lock control flag indicating whether the peripheral device is occupied by one of said plurality of processors;

switching means responsive to the lock control flag of each control table for switching one of said plurality of processors to an unoccupied peripheral device in accordance with said scheduler each time the peripheral device is started during execution of a task or job for a test program; and execution means for performing a desired test of said peripheral device coupled with said processor in association with operation of said switching means.

5. A testing apparatus according to claim 4, wherein said memory means includes update means for updating said lock control flag for each peripheral device upon every starting of the peripheral device through said scheduler independently of execution of the task or job for the test program.

6. A testing apparatus according to claim 5, wherein said scheduler has means for performing a priority processing to inhibit each peripheral device from being accessed by a plurality of processors at a time.

* * * * *